(12) United States Patent
Deverakonda Venkata et al.

(10) Patent No.: US 10,200,500 B2
(45) Date of Patent: Feb. 5, 2019

(54) METHOD AND APPARATUS FOR MANAGING SOFTWARE DOWNLOADS IN A BROADCAST COMMUNICATION SYSTEM

(75) Inventors: Subbaraya Kumar Deverakonda Venkata, Torrance, CA (US); Jianming Yu, Norwalk, CA (US); Charles C. Debergh, Newport Coast, CA (US); Gilbert Zaldivar, Rancho Santa Margarita, CA (US); Joseph T. Hayes, Torrance, CA (US); Romulo Pontual, Hermosa Beach, CA (US); Lonnie Scott Clabaugh, San Pedro, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 1769 days.

(21) Appl. No.: 12/615,880

(22) Filed: Nov. 10, 2009

(65) Prior Publication Data

US 2010/0211942 A1    Aug. 19, 2010

Related U.S. Application Data

(60) Provisional application No. 61/113,144, filed on Nov. 10, 2008.

(51) Int. Cl.
*H04L 29/08* (2006.01)
*H04L 29/14* (2006.01)
(Continued)

(52) U.S. Cl.
CPC ............. *H04L 67/34* (2013.01); *H04L 69/40* (2013.01); *H04N 21/4351* (2013.01); *H04N 21/8166* (2013.01); *H04L 45/28* (2013.01)

(58) Field of Classification Search
USPC ....................................................... 717/173
See application file for complete search history.

(56) References Cited

U.S. PATENT DOCUMENTS

| 6,614,804 B1 | 9/2003 | McFadden et al. |
| 6,625,811 B1 | 9/2003 | Kaneko |

(Continued)

FOREIGN PATENT DOCUMENTS

| EP | 1383335 A1 | 1/2004 |
| WO | 98/18289 A1 | 4/1998 |
| WO | 00/60784 A1 | 10/2000 |

OTHER PUBLICATIONS

Bossoli et al., EP 1 528 723 A1/Application No. 03425706.3.*

(Continued)

*Primary Examiner* — Mohsen Almani
(74) *Attorney, Agent, or Firm* — Harness, Dickey & Pierce, P.L.C.

(57) ABSTRACT

A system and method for a system for communicating with a user device includes a broadcast management system generating content channel data signals. The system also includes a software download manager in communication with the broadcast management system. The software download manager generates an announcement file and a download resolution file. The download manager communicates the announcement file. The user device has user device identifier data and receives the download resolution file in response to the announcement file and stores the software image in the user device in response to the download resolution file.

24 Claims, 12 Drawing Sheets

(51) Int. Cl.
*H04N 21/435* (2011.01)
*H04N 21/81* (2011.01)
*H04L 12/703* (2013.01)

(56) References Cited

U.S. PATENT DOCUMENTS

| | | |
|---|---|---|
| 7,657,885 B2 * | 2/2010 | Anderson .................. 717/170 |
| 7,898,942 B2 | 3/2011 | Takagi et al. |
| 2002/0100035 A1 | 7/2002 | Kenyon et al. |
| 2002/0108115 A1 | 8/2002 | Palmer |
| 2002/0152467 A1 * | 10/2002 | Fiallos ........................ 725/50 |
| 2003/0219081 A1 | 11/2003 | Sheehan et al. |
| 2006/0074750 A1 | 4/2006 | Clark et al. |
| 2006/0195884 A1 | 8/2006 | van Zoest et al. |
| 2006/0218609 A1 | 9/2006 | Johnson et al. |
| 2007/0101379 A1 | 5/2007 | Pereira |
| 2007/0239841 A1 * | 10/2007 | Lehrman ..................... 709/217 |
| 2008/0010342 A1 | 1/2008 | Gebhardt et al. |
| 2008/0016543 A1 | 1/2008 | Kwon |
| 2008/0040767 A1 | 2/2008 | McCarthy et al. |
| 2008/0063394 A1 | 3/2008 | Chi |
| 2010/0205275 A1 | 8/2010 | Yu |

OTHER PUBLICATIONS

International Search Report and Written Opinion dated Apr. 19, 2010 in International Application No. PCT/US2009/063920, filed Nov. 10, 2009 by Subbaraya Kumar Deverakonda Venkata et al.
Non-final Office action dated Jun. 20, 2012 in U.S. Appl. No. 12/615,915, filed Nov. 10, 2009 by Jianming Yu et al.
Non-final Office action dated Apr. 13, 2011 in U.S. Appl. No. 12/615,894, filed Nov. 10, 2009 by Jianming Yu.
Form PCT/ISA/206 Invitation to Pay Additional Fees and Partial International Search dated Feb. 11, 2010 in International Application No. PCT/US2009/063920 filed Nov. 10, 2009 by Subbaraya Kumar Deverakonda Venkata et al.
Final Rejection dated Oct. 25, 2011 in U.S. Appl. No. 12/615,894, filed Nov. 10, 2009 by Jianming Yu.
Final Rejection dated Dec. 20, 2012 in U.S. Appl. No. 12/615,915, filed Nov. 10, 2009 by Jianming Yu et al.
Final Rejection dated Jan. 17, 2014 in U.S. Appl. No. 12/615,915, filed Nov. 10, 2009 by Jianming Yu et al.
Non-final Office action dated Aug. 21, 2013 in U.S. Appl. No. 12/615,915, filed Nov. 10, 2009 by Jianming Yu et al.

\* cited by examiner

METHOD AND APPARATUS FOR MANAGING SOFTWARE DOWNLOADS IN A BROADCAST COMMUNICATION SYSTEM

CROSS-REFERENCE TO RELATED APPLICATIONS

This application claims the benefit of U.S. Provisional Application No. 61/113,144, filed on Nov. 10, 2008. This application is also related to U.S. Ser. No. 12/615,894; and U.S. Ser. No. 12/615,915 filed simultaneously herewith. The entire disclosures of each of the above applications are incorporated herein by reference.

TECHNICAL FIELD

The present disclosure relates generally to a communication system, and, more specifically, to a system and method for downloading content such as software images to devices within the system.

BACKGROUND

The statements in this section merely provide background information related to the present disclosure and may not constitute prior art.

Satellite television is increasing in popularity due to the ever-increasing amount of programming as well as the quality of programming. Programming includes standard national (CONUS) broadcasts, local or regional station broadcasts, on-demand content and interactive content.

Satellite television broadcast systems typically use several satellites. Each satellite has several transponders that receive signals from the ground and broadcast the signals to users. Each transponder is capable of providing a certain amount of content therethrough. That is, each transponder may provide a certain bit rate therethrough.

Set top boxes (STB), which are commonly referred to as integrated receiver decoders (IRDs), are used to receive and decode the signals from the satellite through an outdoor unit. Various models of set top boxes are continually being introduced by various manufacturers. Various models include standard definition models, high definition models, mobile models, boxes with digital video recorders and boxes without digital video recorders. Older technology boxes are used by customers as well. Each of the set top boxes includes a software image which is the software that runs inside the set top box. The software image is typically installed on the set top box by the contractor installing the system into a customer's home. Some operating software may also be pre-installed.

At various times, the software image requires updating. Updating software images is desirable to fix glitches or bugs in the software. Software images may also be updated to support new technology. That is, newer services may be provided to customers that require new operating software or modifications to existing software.

Communicating software updates to set top boxes was performed using a manual process. The manual process is a time-consuming process.

SUMMARY

The present disclosure provides a system for conveniently and accurately providing software images to set top boxes.

In one aspect of the disclosure, a method includes generating a schedule at a software download manager in response to channel data generating a download resolution file in the software download manager, communicating a software image and a download resolution file to a transport processing system in response to the schedule, broadcasting the software image file and the download resolution file, generating an announcement in the software download manager and communicating the announcement to a user device in response to the schedule.

In another aspect of the disclosure, a method includes generating an announcement file at a software download manager, generating a download resolution file at the software download manager and communicating the announcement file from the software download file to a user device. The user device has user device identifier data. The method further includes receiving the download resolution file at the user device in response to the announcement file and storing the software image in the user device in response to the download resolution file.

In a further aspect of the disclosure, a system for communicating with a user device includes a broadcast management system generating content channel data signals. The system also includes a software download manager in communication with the broadcast management system. The software download manger generates an announcement and a download resolution file. The download manager communicates the announcement. The user device has user device identifier data and receives the download resolution file in response to the announcement and stores the software image in the user device in response to the download resolution file.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
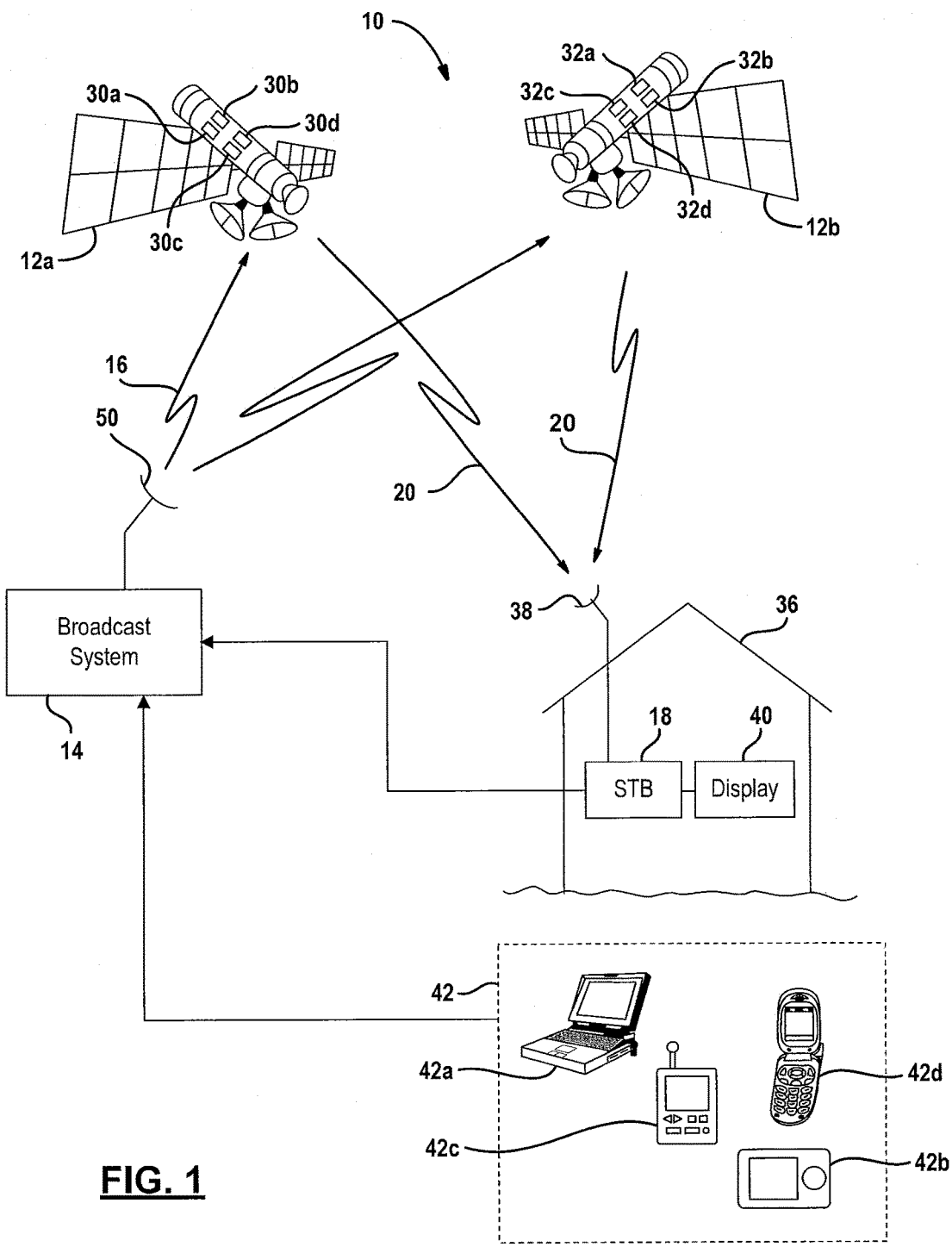
FIG. 1 is a system level view of the communication system according to the present disclosure.

The following description is merely exemplary in nature and is not intended to limit the present disclosure, application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

The present disclosure is set forth with respect to a satellite broadcast television system. In particular, the following disclosure is made with respect to DIRECTV® broadcast services and systems. It should be understood that many other delivery systems are readily applicable to disclosed systems and methods. Such systems include other wireless distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a head end (HE), integrated receiver/decoders (IRDs) and a content delivery network (CDN) as described below can be reallocated as desired without departing from the intended scope of the present patent.

Further, while the following disclosure is made with respect to the delivery of software or software updates (e.g., television (TV), movies, music videos, etc.), it should be understood that the systems and methods disclosed herein could also be used for delivery of any content type, for example, audio, music, television, data files, web pages, etc. Additionally, throughout this disclosure reference is made to data, software images, content, information, programs, software, movies, assets, video data, etc., however, it will be readily apparent to persons of ordinary skill in the art that these terms are substantially equivalent in reference to the example systems and/or methods disclosed herein. As used herein, the term title will be used to refer to, for example, a movie itself and not the name of the movie.

Referring now to FIG. 1, a satellite communication system 10 is illustrated having a first satellite 12a and a second satellite 12b. The communication system 10 may be a satellite television system or data distribution system.

The system 10 may include a broadcast system 14 for generating uplink signal 16 to the satellites 12a and 12b. The signals may correspond to various channel streams or multiplex channel streams that are communicated from the satellites 12a, 12b to a fixed user device 18 through downlinks 20. The uplink signals may include data streams such as conditional access signals that include software upgrade announcements as will be described below. The uplink signals may also include software image and download resolution files. Only one user device 18 is illustrated by way of example. However, a system 10 may include several user devices.

Satellite 12a may include a plurality of transponders of which four are illustrated as reference numerals 30a-30d. The satellite 12b may also include a plurality of transponders including transponders 32a-32d. The transponders 30a-30d and 32a-32d receive the uplink signals from the broadcast system 14 and direct the signal, such as television signals, through the downlinks 20 to various users. The downlink signals 20 may be Continental United States (CONUS) or may be spot beam signals. As will be further described below, various allocations of channel signals to the various transponders may be provided. The transponders may be part of a network. Transponders 30a, 30b, 32a and 32b are uplink transponders. Transponders 30c, 30d, 32c and 32d are downlink transponders. Although only four are illustrated, several different uplink transponders and downlink transponders may be provided in each satellite.

The user device 18 may comprise a set top box (STB) disposed within a home or business 36. An antenna 38 is used to receive the downlink signals 20 and provide them to the user receiving device 18. The user receiving device 18 may be in communication with a display 40 for displaying the channel signals. The user device 18 may include a computer or computing device.

Another type of user device may also be included in the system, a mobile receiving device 42. A plurality of mobile receiving devices is illustrated in box 42. A portable computer 42a, a portable media player 42b, a personal digital assistant 42c and a cellular telephone 42d are illustrated. Each of the devices includes an antenna that may be integral therewith for receiving the downlink signals 20. Different types and numbers of mobile devices may also be included in the system. It should be noted that both fixed and mobile user devices may be included. Of course, either fixed or mobile alone may be used in a system.

The user devices 18, 42 have model numbers, manufacturers serial number, network access cards or the like, each of which has an identifier associated therewith. The user devices 18, 42 may also have operating software that has a version or revision identifier or other software identifier associated therewith.

The broadcast system 14 includes an antenna 50 for uplinking uplink signal 16 to satellites 12a and 12b. Although only one antenna 50 is illustrated for simplicity purposes, more than one antenna may be used.

Figure 2:
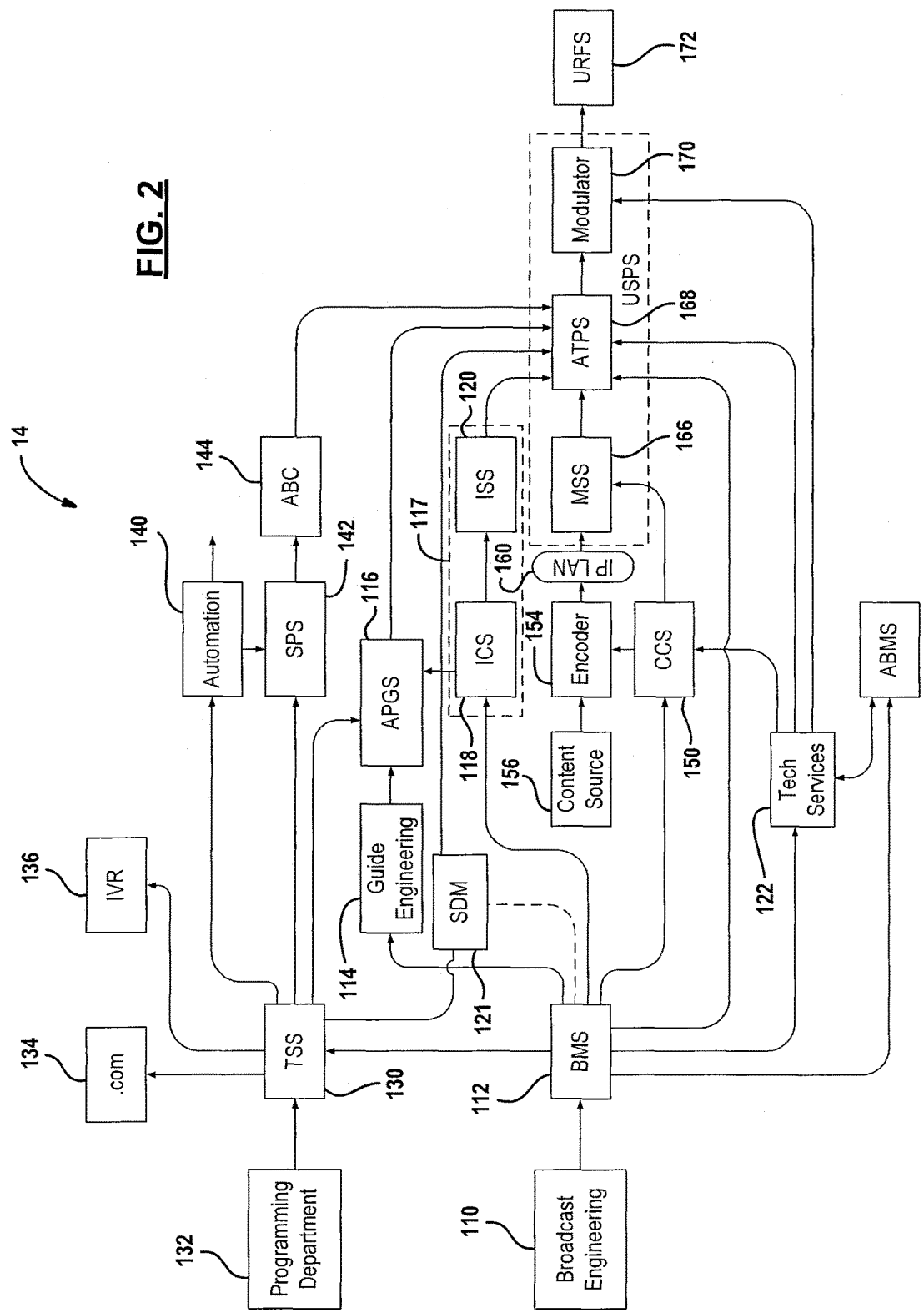
FIG. 2 is a block diagrammatic view of the broadcast system 14 of FIG. 1.

Referring now to FIG. 2, a block diagrammatic view of the broadcast system 14 of FIG. 1 is illustrated in further detail. The broadcast system 14 includes a broadcast engineering module 110 that is used for providing various inputs to a broadcast operation channel management system (BMS) 112. One example of a BMS system is set forth in application Ser. No. 12/041,952, entitled "Asset Allocation System and Method for Allocating Satellite Resources in a Satellite Broadcast Communication System" filed on Mar. 4, 2008, the disclosure of which is incorporated by reference herein. The BMS system 112 is used to allocate the resources of the satellites 12a and 12b illustrated in FIG. 1. Each transponder in the satellites is capable of providing various throughput which is referred to as a bit rate. The BMS system 112 provides a centralized and automated system to manage and maintain the content channel information for a bit rate allocation chart in a database and communicates various data to various components of the broadcast system 14.

The BMS 112 may provide boot packet identifiers (PIDs) and rates to a guide engineering module 114. Guide engineering 114 may receive the data in various formats including email. Guide engineering 114, in turn, uses the information received to form the program guide in the advanced program guide system 116.

The BMS 112 may also be used to provide channel and program identifier assignments to an interactive content head end 117 that includes an interactive content scheduler (ICS) 118. The ICS 118 may provide various data to an interactive streaming server (ISS) 120. The interactive content scheduler 118 provides functions for creating a streaming service, associating content channels with the service, scheduling the services, informing the advance programming guide system 116 of changes in the channel objects and requesting the interactive streaming server 120 to broadcast the streaming services and necessary metadata. Content channels may not correspond to what is thought of as a broadcast channel. That is, content channels may correspond to a broadcast channel but may also include several broadcast channels. Content channels may be used for communicating data, video or audio content.

The ISS 120 executes the broadcast schedule provided by the interactive content scheduler. The ISS 120 performs the necessary data packetization and broadcasts the data files at the broadcast event time specified by the interactive content scheduler 118. The functions of the interactive content scheduler and the interactive streaming server will be described below.

The BMS 112 may provide interactive television (iTV) channel data, PID assignments and rates via XML to the ICS 118.

The BMS 112 may also be in communication with a software download module or manager (SDM) 121. The BMS 112 may interface with the SDM 121 and the ICS 118 using an XML-based web service. The SDM 121 may receive resource allocations such as software download (SWDL) channel, data channel PID assignments and bit stream rates from the BMS 112. This will be described in more detail below.

The BMS 112 may also be in communication with a technical services module 122. The technical services module 122 may receive various bit rate allocation chart information. Bit rate allocation chart information may also be provided from the BMS 112 to an advanced broadcasting monitoring system (ABMS) 124. The advanced broadcasting monitoring system 124 may be used to monitor the quality of signals throughout various portions of the broadcasting system 14.

The BMS 112 may also provide channel definition and mapping data to a traffic and scheduling system 130. The traffic scheduling system 130 may receive a program schedule from a programming department 132. The traffic and scheduling system 130 may generate schedules to a dot com module 134 used for ordering various content through an external computer interface. The data from the traffic and scheduling system 130 may also be provided to an interactive voice recognition (IVR) system 136 that also may be used to order various content.

The TSS 130 may provide guide channel data to the software download manager 121. A listing service within the TSS 130 may provide the guide channel data.

The traffic and scheduling system 130 may also provide scheduling information to an automation system 140. The automation system and the traffic and scheduling 130 may be in communication with a scheduled pad server 142. The scheduled pad server 142 may receive program-associated data (PAD). The scheduled pad server 142 delivers program-associated data to an advance broadcast controller 144.

The BMS 112 may provide compression control system configuration data to a compression control system 150. The compression control system 150 may provide data to an encoder 154. The compression control system 150 may provide the data to the encoder 154 for configuring the encoder 154. The encoder 154 may receive content from a content source 156. The content source 156 may be various live content sources provided from satellite or fiber. The content sources may also be based on file or tape-based content received from a content repository. The encoder 154 may be used to encode the various content from the content source 156 according to the configuration provided from the compression control system 150. The encoder 154 may communicate the encoded signals through a local area network such as an Internet protocol local area network 160. Of course, various numbers of encoders 154 may be provided.

The output of the encoders may be referred to as a single program transport stream (SPTS). The local area network 160 may include a plurality of routers or the like to route the single transport streams to one of a plurality of uplink signal processing systems 164. Each uplink signal processing system may correspond to the output of a single transponder within one of the satellites 12a, 12b.

The uplink signal processing system 164 may include a multiplexing splicing system (MSS) 166, an advanced transport processing system (ATPS) 168 and a modulator 170. Although not shown, multiple components within the uplink signal processing system may have redundant systems.

The advance transport processing system 168 may receive various data signals from the advance broadcast controller 144, the advance program guide system 116, the interactive streaming server 120 of the interactive head end 117, the BMS 112 and technical services 122. The multiplexing splicing system 166 may also receive configuration information from the compression control system 150. The compression control system 150 may generate configurations so that the multiplexing splicing system 166 receives the desired single-program transport streams through the LAN 160.

The technical services module 122 may also be in communication with the modulator 170 to provide configuration and feedback for the modulator 170.

The output of the modulator is in communication with an uplink RF system (URFS) 172. The uplink RF system 172 generates the uplink signal 16 as illustrated in FIG. 1. The uplink RF system may include the antenna 50 of FIG. 1.

It should be noted that various configurations of the block diagrammatic view illustrated above, may be provided. For example, should the output of the encoder 154 not be IP ready, the IP LAN 160 may be removed and a direct connection between an encoder and the multiplexing splicing system 166 may be provided. Further, the advance broadcast monitoring system 124 may also be eliminated.

Figure 3:
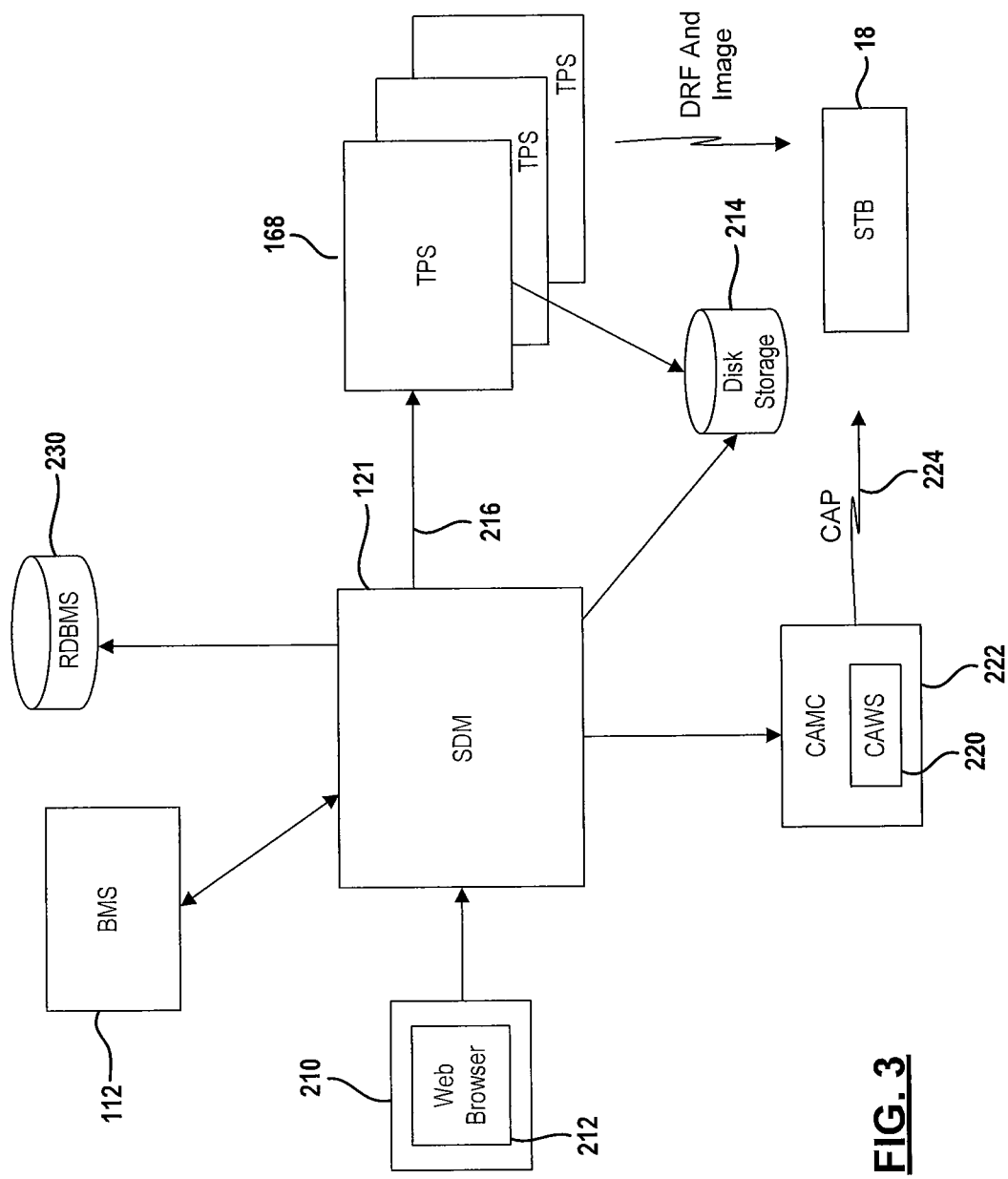
FIG. 3 is a high-level block diagrammatic view of the software download manager interfacing with various components of the system.

Referring now to FIG. 3, the Software Download Manager (SDM) 121 manages the head-end software download activities. A software image is the software running inside the user device such as the set top box (STB) 18. The software image that is released for a specific manufacturer and model is ingested into the system by a user 210 of SDM. The ingested software image may be pre-packetized before being ingested or packetized within the SDM 121 so that transport compliant packets may be formed. A memory 214 such as disc storage 214 may be used to store the software image. The memory 214 may be internal to or external to the SDM 121.

As will be described further below, the user 210 creates a software download (SWDL) schedule to broadcast the image using a user interface 212 such as a web browser 212. In addition, the user 210 identifies the particular user devices 18 that are to be targeted for the software download and schedules software download announcements for the targeted STBs.

The Software Download (SWDL) Schedule has various data for broadcasting the software image and announcing to the set-top box that an updated software image is available for downloading. The schedule data may include a schedule start time, a schedule stop time, download recurrence, broadcast recurrence, broadcast mode, targeted software version, download urgency, announcement target (target region or list of security card or CAM identifiers) and targeted software version for emergency downloads.

The SDM 121 also creates a Download Resolution File (DRF) that contains data about the software images which are broadcast currently. For example, the DRF may include all the manufacturers, models and software version for which the software upgrade is being broadcast. The DRF also contains location data for the software image such as a service channel identifier (SCID) on which an image for a particular manufacturer, model and version are available for download. The SDM 121 generates the DRF for the image broadcast, using the SWDL schedule created by the user. Broadcast Mode (or Pipe Mode) distinguishes the software images that are broadcast for customers from the images that are broadcast for engineering and development purpose. The broadcast mode of a software image broadcast is identified by the DRF (Download Resolution File) in which the entry for the software image is made. In the following example, three broadcast modes supported in SDM are: Developmental which is used for engineering and development purpose, Live which is used for customers and Beta which is used for customers for experimental software. Every Broadcast Mode in a Transponder is associated with a unique DRF within that transponder.

The software download module (SDM) 121 receives content channels data to be used for broadcasting DRF and software images from the Broadcast Management System (BMS) 112. A content channel is a communication pipe to send audio, video and data packets. Each content channel may have the following attributes: a network, a transponder, a service channel identifier (SCID) and a bit or data rate. In the event of any updates to communication resources content channels, BMS 112 notifies SDM 121 about the update by calling a web service, running inside SDM 121. The SDM 121 then calls BMS 112 using a web service, running inside BMS 112, to get all the data related to all content channels allocated for SDM 121. SDM 121 can also request BMS data via the same web service running inside SDM 121 to get all the content channels allocated for software downloads at any time. SDM 121 usually requests this data during start ups to ensure synchronization with BMS 112.

At the scheduled broadcast time, the SDM 121 assigns a content channel to the software image packets and the generated DRF packets and communicates them to the corresponding transport processing system (TPS) 168. The TPS 168 receives requests to broadcast software images and DRF files from the SDM 121. The SDM 121 communicates with TPS 168 using a network 216 such as a telnet. The SDM 121 establishes a socket connection on a port such as port 23 to communicate with TPS 168. The SDM 121 talks to several TPS systems. Each TPS system is dedicated to a unique combination of a network and transponder. By way of example, there may be up to four TPS devices associated with a network and transponder. The SDM 121 communicates the same information to all the configured TPS devices for the TPS system. Each TPS 168 device falls into one of the following categories: regular primary, regular backup or engineering. There can be several devices configured for engineering purpose.

TPS 168 does not maintain states across restarts. Hence, the SDM 121 has to keep track of the TPS 168 being up or down and take the appropriate action. The TPS 168 then broadcasts both the software image packets and the DRF packets on the assigned content channel over the satellite. It should be understood that another type of network such as a terrestrial network may be used to communicate the DRF and the software image. The DRF and the software image may be continually broadcast for the scheduled time. That is, the broadcast may be started a number of times during the schedule time in a carousel-like manner.

After the download resolution files (DRF) and the software images are being broadcast, an announcement notifies the user device about software images which are impending or currently being broadcast. The announcement may be referred to as an announcement file or announcement signal. For brevity they will be referred to as announcements. The SDM 121 generates the announcements and announcement requests. The requests send announcements to all the targeted STBs to download the software image. The system sends the announcement requests to a Conditional Access Web Service (CAWS) 220 which may be part of a Conditional Access Management Center 222 at the appropriate announcement schedule. CAWS 220 is an external interface to SDM 121 which receives requests to announce the availability of software image for download. The announcement has an announcement time and an announcement target associated therewith. The announcement target represents a list of one or more access card identifiers such as CAM IDs or a target geographic region string that is a targeted destination for a download announcement that is sent by SDM through CAWS 220. A target string takes advantage of the Conditional Access Management Center (CAMC) 222 and allows large quantities of STBs in a target region or other grouping to be targeted with a single command. Typically target regions are defined by time zones (Pacific or Mountain Time Zone, etc) or Designated Market Area (DMA) which is a smaller area such as San Diego, Calif. or Detroit, Mich. The announcement time is the time when the announcement is sent from the system to inform the set-top box to download the software image at a specified download time. The announcement may include the location of a DRF such as a network identifier, a transponder identifier and a channel or service channel identifier. The version of the software targeted for update may also be included in the announcement. The announcement may also include a private block that contains a multicast IP address and a port identifier.

The announcement is communicated to the user device 18 such as the set top box through a conditional access packet (CAP) 224. The conditional access packet 224 may be communicated through a satellite or another network such as a terrestrial-based wired or wireless network. The system for generating the CAP may be different than that communicating software images and content.

The transport processing system 168 communicates the software image and the DRF to the set top box 18 through the satellite or a terrestrial communication means such as a wired or wireless network. The user device 18 receives an announcement and looks for the DRF based upon the announcement. The DRF is used by the user device 18 to locate the image in response to the data contained in the DRF.

A system administrator and an operator of the SDM 121 may be provided. The system administrator may be a user that has broader ability to change various settings within the SDM 121. For example, the system administrator may configure various external interfaces with the CAWS 220 or CAMC 222, the TPS 168, and the BMS 112. The system administrator may also configure the SDM system 121 by adding various models and associated manufacturers, editing various models, removing models, removing or editing manufacturers, configuring content channels, configuring announcement parameters, configuring broadcast parameters which include the time required for the DRF and the image to reach the set top box from the time that they are sent to the TPS from the SDM, editing DRF multicast IP and ports and pre-defining custom target strains. A super administrator may have authority to provide general announcements.

An operator may use the web interface 212 to ingest new images, remove ingested images, associate manufacturer and models to ingested images, create software download schedules, modify software download schedules, and cancel software download schedules. The software download manager 121 may also include a relational database management system 230 used to manage the various databases containing the data for the schedules and other data.

Figure 4:
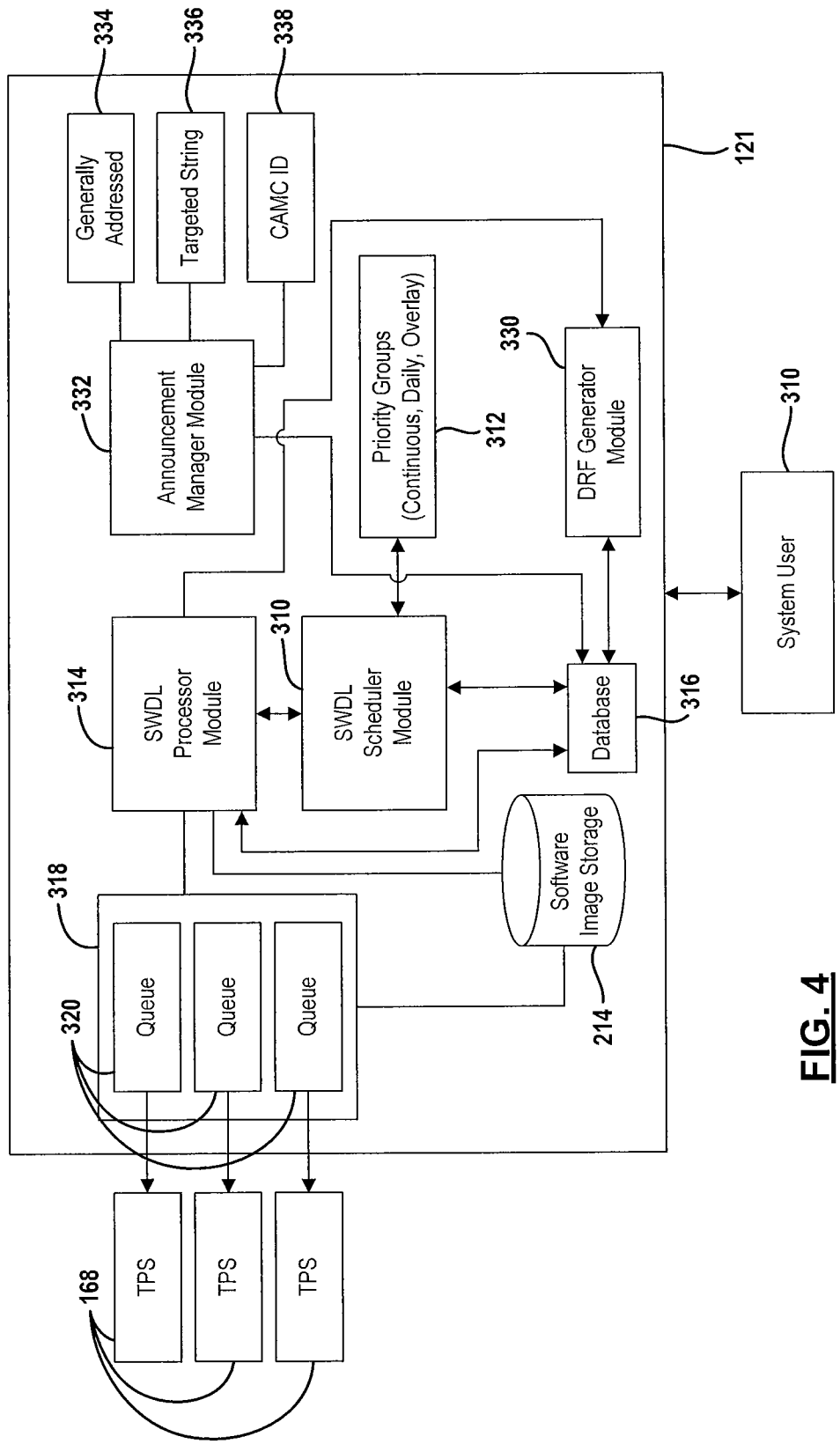
FIG. 4 is a detailed block diagrammatic view of the software download system of FIG. 3.

Referring now to FIG. 4, the software download manager 124 is illustrated in further detail. The software download manager 121 is illustrated relative to the transport processing system 168 and a user 210.

The software download scheduler module 310 may be in communication with priority groups 312. The priority groups 312 represent software images that are required to be downloaded. The priority groups 312 may have various priorities desired for sending out the software images. For example, the priority groups may be, but are not limited to, continuous, overlay and daily. The priorities may be based upon time or urgency of the software. The SWDL scheduler module 310 scans all the priority groups 312 periodically, picks SWDL schedules, assigns a content channel to the groups and communicates with a SWDL processor module 314. A database 316 may be used to track all of the software downloads scheduled. The database 316 may communicate with all or nearly all of the components in the SDM 121. The software scheduler module 310 may also lock channel resources once assigned. As will be described below, the broadcast management system (BMS) or traffic and scheduling system (TSS) may also provide updates and the software download scheduler 310 may update channel assignments at that time.

The software download processor module 314 is used to interface with the transport processing system 168 through the use of a queue 318. The queue 318 may actually be comprised of a number of individual queues 320 associated with each of the transport processing systems 168. The overlay process will be further described below.

The software download processor module 314 sends and aborts software images from the transport processing system, waits for announcement padding time to allow the schedule announcements to reach the set top box or user device and all process. The software download processor module 314 then sends the download resolution files and then waits for a broadcast padding time to ensure that the download resolution files are broadcast at the transport processing system 168. Thereafter, announcements are scheduled. During updating of the transport processing system announcements are not sent. If announcements are sent prior to the software image or DRF being available, the user devices may be locked-up while looking for the DRF. Locking user devices should be avoided.

SWDL Processor module 314 receives requests to abort or schedule a software download from the scheduler module 310. A unique combination of network, transponder and broadcast mode (LIVE, BETA, DEV) have a separate thread of execution. A data class in the database 316, "TpsContents," contains details about all ongoing SWDLs and the DRF for a unique combination of network, transponder and broadcast mode. Every "TpsContents" has an associated queue 320 to which all the SWDLs to be processed are added. The SWDL Processor module 314 adds all the SWDLs, which belong to a particular TpsContents (based on content channel attributes) to its (TpsContents) queue. A software image for download goes into the queue in the following scenarios:

Scheduler processor 314 interrogates SWDL Scheduler module 310 periodically. The scheduler module picks up SWDLs as per the algorithm and adds it to the appropriate "TpsContents" queue.

A continuous SWDL is scheduled by the user.

An Abort is requested by the user.

The SWDL Processor module 314 notifies "TpsContents" about the updates to the queue in all the above scenarios. A "TpsContents" class has a thread (SwdlUpdateThread) which processes all the requests added to the queue. The thread will be in a wait state until it gets notified about an update to the queue. When a continuous software download (SWDL) is scheduled, the thread gets notified after all the SWDLs for that iteration are added to the queue. When aborting or during an update, only one SWDL is under consideration. Hence, the thread gets notified just for that SWDL.

A DRF generator module 330 is used to create the download resolution files. The DRF were described in detail with respect to FIG. 3.

An announcement manager module 332 is used to generate an announcement. The announcement manager module 332 may be in communication with a plurality of queues including a generally addressed queue 334, a targeted string queue 336 and a CAMC ID queue 338. The announcement manager may generate an announcement in response to a schedule announcement signal from the SWDL scheduler module 310.

Timing between the download resolution file (DRF) and the announcement is important. Generally, announcements are communicated to the user devices after the DRF and software images are being broadcast. The following times are provided by way of example. The times may vary with different systems and configurations. For the TPS to replace the existing file with a new file, it takes about 4 seconds. This delay is termed as "Broadcast Padding Time". A user device 18 looks for a DRF for a minimum of 2 seconds when it receives an announcement. After this point the box starts looking for the DRF on all the transponders from 1 to 3 times. This process is referred to as a "walk". It takes about 10 minutes to loop through all the transponders. User devices 18 in the walk mode do not process television signals. A customer may deem this an outage. If an announcement for a previously scheduled software download (SWDL) on the network, transponder and broadcast mode is received by the user device, a DRF may not be found causing the walk-mode. Hence we want to minimize the DRF replacement and entering into a "walk" condition.

The time it takes for the announcement to be communicated to the user device from the time it is scheduled at SDM 121 is termed an "Announcement Padding Time." All announcements which are scheduled to be sent out in the three scenarios may be delayed by the announcement padding time. The announcements may be sent out once the DRF and software images are sent out and broadcast padding time expires. A flag in "TpsContents" indicates whether the announcements can be sent out at a particular time or not. The announcement component reads this flag and decides on announcement processing.

In the event that SDM 121 goes down and comes back up, SDM gets the previous state of image downloads from the database table. The SDM 121 does not know if any TPS went down while it was down. The SDM 121 tries to re-send all the continuous images and DRFs which it determines should be going to the TPS 168. The SDM 121 also reschedules any announcements that are scheduled. The SDM 121 remembers the last time it scheduled downloads using SWDL Scheduler. Using this time it determines the next time it has to send out downloads and starts the scheduler based on that. If a maintenance window is configured, the SDM 121 does not send out any new images, DRFs or announcements during that time. If a TPS has data related to some SWDLS it does not harm the box since announcements are not required.

Figure 5:
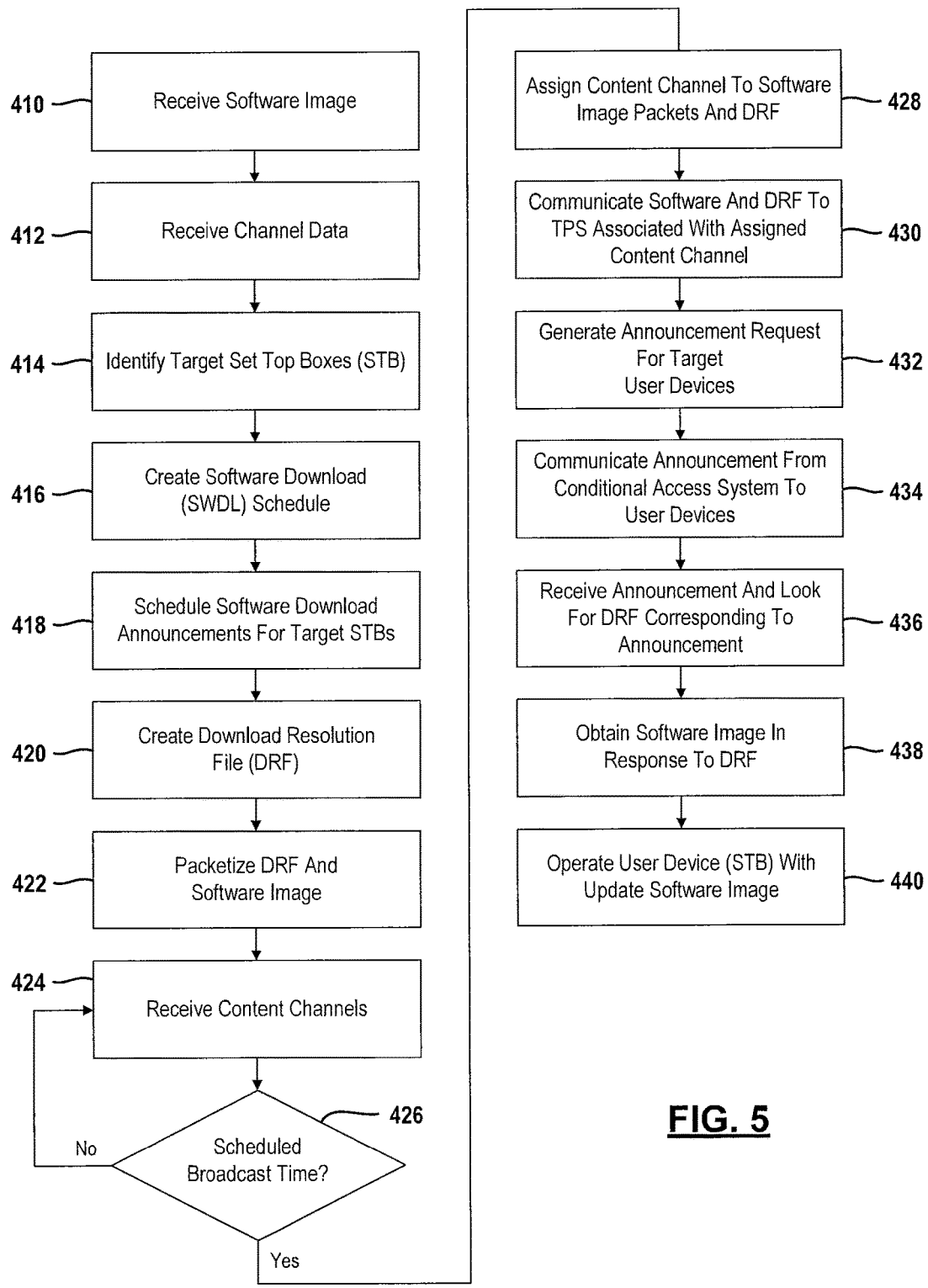
FIG. 5 is a flowchart of a method for operating the software download system.

Referring now to FIG. 5, a method for communicating a software image to a user device such as a set top box is set forth. As mentioned above, the software image is used as an example. Other types of content may be communicated and announced in a similar manner. In step 410, a software image is received at the software download module. The software image may be stored in a memory or disc storage associated with the software download module. In step 412, channel data from the BMS is received. In step 414, target user devices such as set top boxes are identified. The identifier data for the targeted user devices may be model numbers, version, revision numbers or other identifiers. In step 416, the software download schedule for the software image is created. The schedule may include various types of data including a schedule start time, a schedule stop time, download recurrence, broadcast recurrence, broadcast mode, targeted software version, download urgency, announcement targets, and targeted software for emergency downloads.

In step 418, software download announcements for the targeted user devices are generated. In step 420, download resolution files containing information such as the network, transponder and channel for the user devices are generated. The download resolution files and the software images are packetized. The software images may be packetized prior to being received at the software download module. The software download module may also packetize both the download resolution file and the software image files. In step 424, the content channels and their configuration data are received from the BMS at the SDM. In step 426, it is determined whether the scheduled broadcast time according to the SWDL schedule is provided. In step 426, if the scheduled broadcast time is not reached, step 424 is again performed. After a scheduled broadcast time is reached, step 428 assigns the content channel to the software image packets and the download resolution file. In step 430, the software image and the download resolution files are communicated to the TPS associated with the assigned content channel. This may take place through a queue as will be further described below. The transport processing system (TPS) may communicate the software image and the download resolution file to a satellite or other distribution mode.

In step 432, an announcement request for the target set top boxes is generated. The announcement request may trigger an announcement to be communicated from a conditional access system to the user devices in step 434. In step 436, the user device, such as a set top box, receives the announcements and in response looks for a download resolution file corresponding to the announcement. The download resolution file has data for receiving the proper software image.

In step 438, the software image is received by the user device. As mentioned above, the software image may be repeatedly broadcast from the satellite or through a network. By providing the announcement after the software image is being broadcast, the user device is not required to wait for broadcasting. This will speed up the process and improve customer satisfaction.

In step 440, the downloaded software image is used to operate the user device. The downloaded software image may replace previous versions of the software image. As mentioned above, software fixes, bugs, changes in software and changes in services may all be changed using the software image.

Figure 6:
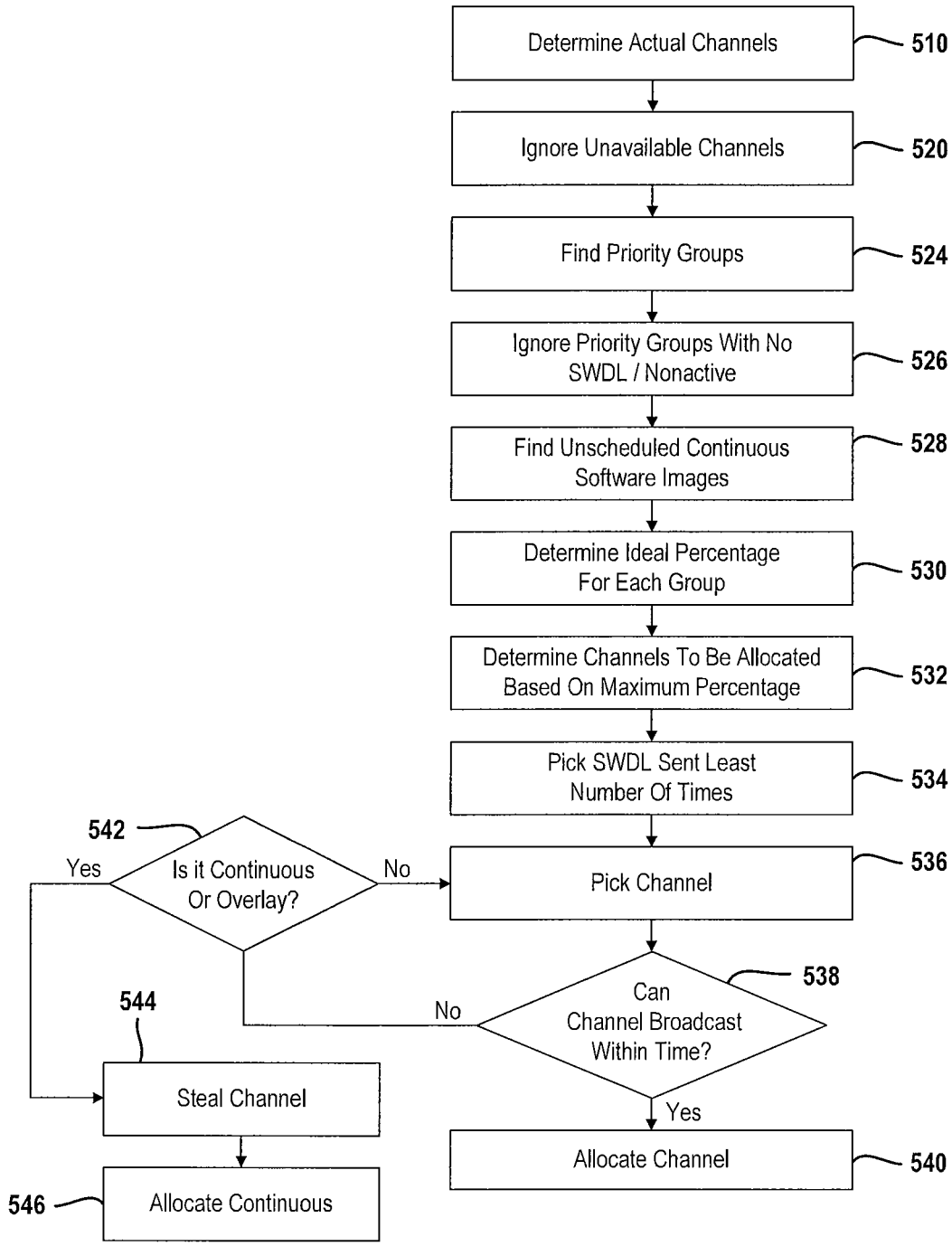
FIG. 6 is a flowchart of a method for allocating channels in non-continuous and continuous software download schedules.

Referring now to FIG. 6, a method for allocating channels is set forth. Both non-continuous and continuous software downloads may be performed. In step 510, the active channels are determined. The active channels may be determined from a list or data provided from the broadcast management system. In step 520, the various channels that are unavailable are ignored. Channels that may be ignored are channels which are allocated for software downloads that will be finished in the future. Other channels that may be ignored are channels that are allocated to download resolution files. Channels whose end times fall in a scheduler execution time window may also be ignored.

In step 524, priority groups are found. Priority groups that do not have any software downloads or are not active are ignored in step 526. In step 528, any continuous unscheduled software images that are not scheduled because of unavailability of a content channel, are determined. The system jumps down to step 536 if unscheduled continuous software images are found in step 528. The process for continuous software images will be described further below.

In step 530, the ideal percentage for each group is determined. The ideal percentage for each group is based on the percentage of iterations remaining for the day or for the schedule and the priority. The ideal percentage may, for example, be calculated by:

Total remaining iterations for this group/total number of iterations for all groups+1/priority*10

In step 532, the number of channels to be allocated based on a minimum or maximum percentage is determined. In step 534, the group with the highest priority is determined and the software download under the group which has been sent out the least number of times is determined. In step 536, a channel to be used for the same broadcast mode as the software download schedule and broadcast type the same as the one configured for the image is picked. In step 538, it is determined whether or not the channel can broadcast the image within the amount of time allocated. In step 540, the channel is allocated when the software image can be broadcast within the channel broadcast time.

Referring back to step 538, if the channel cannot be broadcast within the broadcast amount of time for a non-continuous image, step 536 is again performed.

When a continuous software image is selected, the continuous images have higher priority than the non-continuous software images. Referring back to step 522, if the image is continuous, step 536 is performed in which a channel is picked. Step 538 and step 540 determine whether the channel can broadcast the image in the amount of time and a channel is allocated in step 540 if step 538 is true. The feedback loop for step 538, if the channel cannot broadcast, has additional steps. In step 542, whether the channel is continuous or overlay is determined. If a channel is not, step 536 is again performed and another channel is picked. However, if the channels are continuous or overlay, step 544 steals or takes over a channel from a lesser priority group and in step 546 the software image is allocated to the stolen channel.

Figure 7:
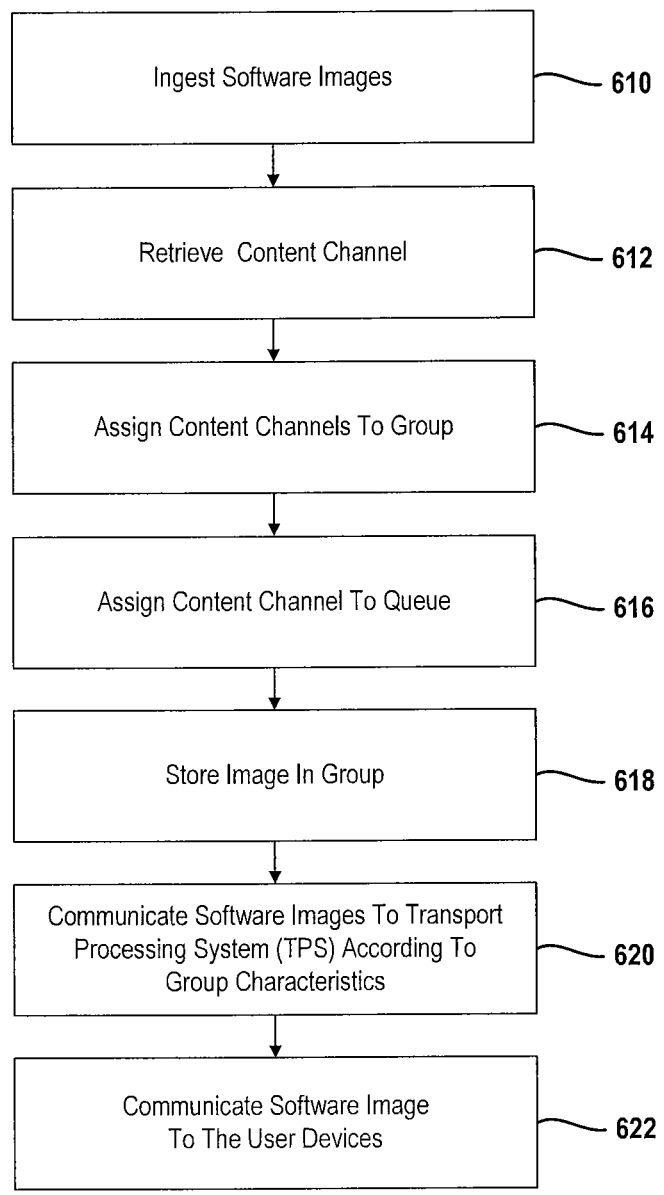
FIG. 7 is a flowchart of a method for allocating groups for a transport processing system.

Referring now to FIG. 7, a method of using queues for distribution of control such as software images and download resolution files for communication to transport processing systems is set forth. In step 610, software images are ingested. The software has image data associated therewith. The image data corresponds to identifiers for the image. In step 612, the content channels are allocated. Content channels may be allocated as live channels, Beta channels or development channels.

In step 614, content channels are assigned to the group. For example, queues for continuous software download images and non-continuous software download images may be set forth. Continuous channels may be allocated to or may be associated with hardware models that are "the latest" models available. Because the models are currently being installed by installers, the images are to be available continuously. Other software models may require updating infrequently. Infrequent changes to older models may include software bugs or fixes but are not as critical. Non-continuous software images may be allocated to only a portion of a day or a portion of any time period. Day, time active and bandwidth may all be part of the queue characteristics.

In step 616, the content channels are assigned to the queues. The queues will have queue characteristics that are derived from the content channel data. The software images are stored in the groups in step 618 based on the characteristics of the software which are set forth in the software image data associated with the software image. The priority may be considered for the software image including whether the image is continuous or non-continuous. In step 620, the software images are communicated to the transport processing system according to the group characteristics. It should be noted that the software download images may be stored in a database and a communication signal communicated to the transport processing system to inform the transport processing system that the particular software image is available. The software image will thus be transferred from the database or other storage directly to the transport processing system (TPS) where it is communicated through the satellite or other network to user devices such as a set top box. Thus, the request for the image may be in the queue and the software image may actually stay stored in the database until needed. A transfer through the queue to the TPS may be performed. In step 622, the software image is communicated to the user device or devices from the queue of the TPS.

Figure 8:
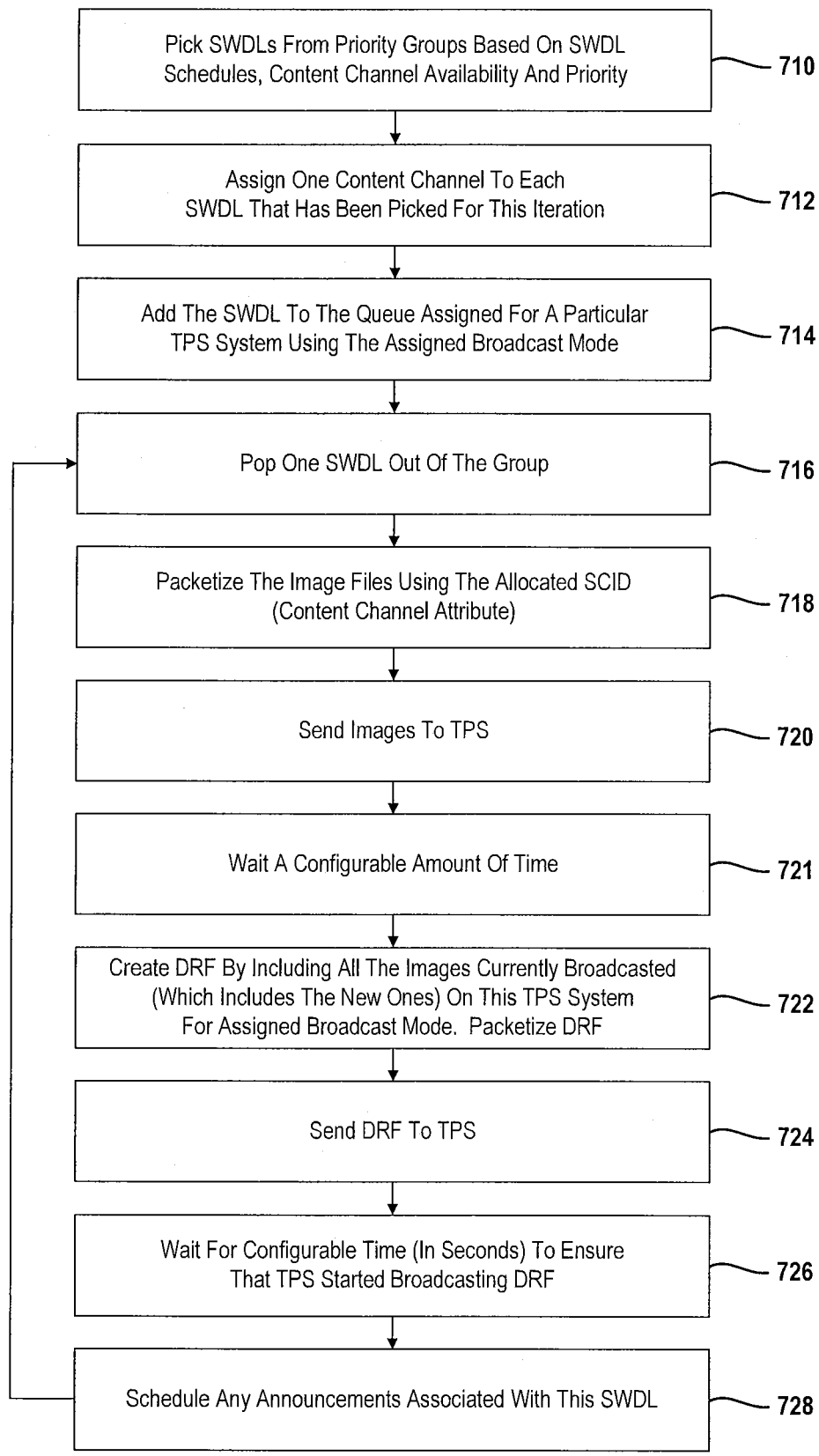
FIG. 8 is a flowchart of data flow for the software download manager.

Referring now to FIG. 8, the data flow for software download processing is illustrated. In step 710, software downloads are picked from priority groups based on software download schedules and the content channel availability. The software download manager looks at all the work and the priorities. It should also be noted that certain manufacturers of certain set top boxes or user devices are assigned to certain transponders. Therefore, particular transponders may only be assigned to communicate with certain user devices.

In step 712, a content channel is assigned to each software download that has been picked for this particular assignment or iteration. The service channel identifier, which is part of the data of a content channel, is assigned for the software download. In step 714, the software download is added to the queue assigned for a particular transport processing system using the assigned broadcast mode. The software download manager sends different software images to different transport processing systems based upon the different broadcast modes. Software downloads in different groups are processed similarly and in parallel. In step 716, one software download is removed from the group. In step 718, the software images are packetized using the allocated service channel identifier (content channel attribute). It should be noted that the software images may be prepacketized. In step 720, the software images are sent to the transport processing system. In step 721, a configurable amount of time is waited before step 722. In step 722, a download resolution file (DRF), including all the images currently being broadcast on the particular transport processing system for an assigned broadcast mode, is provided. Step 722 may also digitize the download resolution file. In step 724, the download resolution file is provided to the transport processing system. In step 726, a configurable amount of time is waited to insure that the transport processing system has started to broadcast the download resolution file. It should be noted that the software images may also be downloaded at this time. After a configurable time, step 728 schedules announcements associated with the software download. By providing the announcements after the download resolution file is being broadcast, the user devices may not be "frozen" waiting for a download resolution file.

Figure 9:
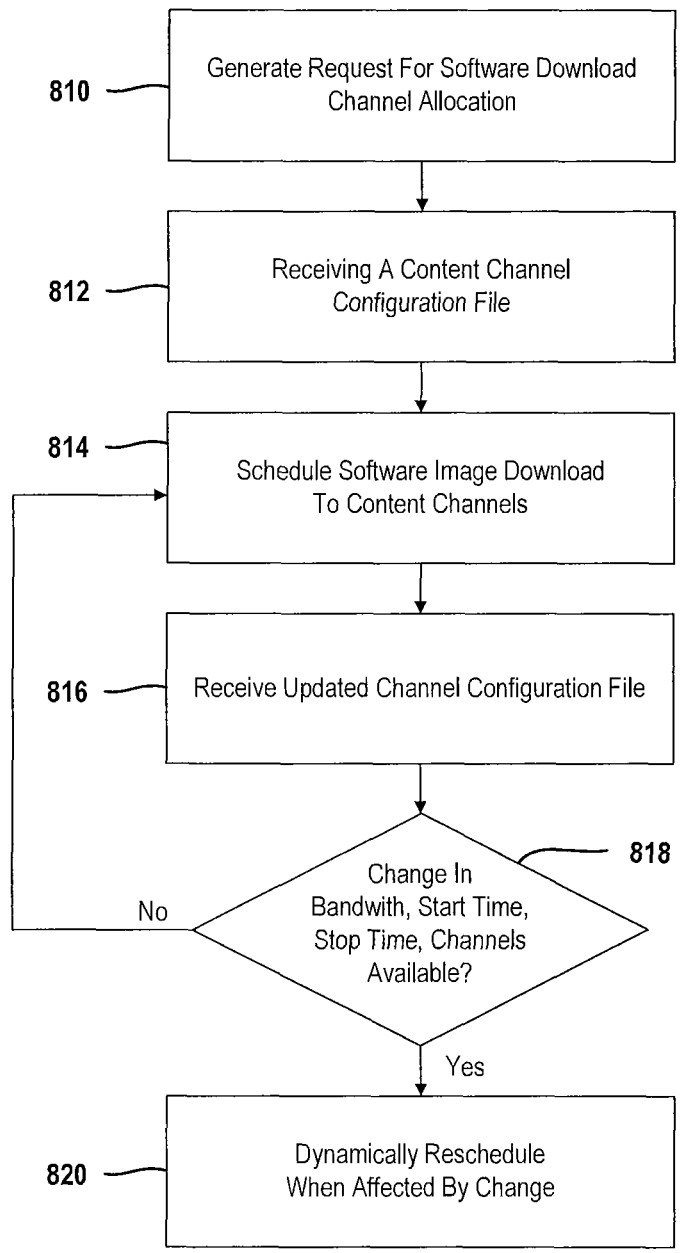
FIG. 9 is a flowchart of a method for dynamically rescheduling software downloads in the event of a channel content configuration change.

Referring now to FIG. 9, a method describing the broadcast management system interface with the software download module is set forth. As is described below, the broadcast management system may allocate or reallocate channel configurations throughout the day. The software download manager using the assignment algorithms described herein can reallocate content channels for various software downloads. This can be performed easily and automatically by the software download manager. Communication between the broadcast management system and the software download manager may be performed automatically or upon request.

In step 810, a request for software download channel allocation is set forth. This also may include a download resolution file channel allocation. In step 812, a content channel configuration file is received from the broadcast management system at the software download manager. In step 814, the software download manager schedules the software downloads on the particular content channels. Details of this process are described above. In step 816, an updated content channel configuration file is received. In step 818, a determination of whether updates have been made in the configuration is determined. Possible updates to the channel configuration include changes to the end date and time and the data rate. The channels available and the start time may also be changed. A channel configuration may also not be in existence.

In step 820, the software download management dynamically reschedules the channel schedule when affected by the change. Rescheduling may be performed in various ways. This may also include changing the associated DRFs and announcements. When a change is determined, announcements may be discontinued until new announcements reflecting changes in the new channel data are generated. The transport processing system and queues may also be changed accordingly.

When the end date is advanced to a point where it falls into the next scheduler iteration and the software download scheduler is active for more than 1.5 times the scheduler frequency, the software download manager may reassign a new channel configuration. However, if the end date is advanced to a point where it falls within the next scheduled iteration and the software download scheduler is active for less than 1.5 times the scheduler configuration, the software download manager may abort the software download schedule. If the end date falls after 1.5 times the scheduler frequency, the software download manager may reallocate a channel configuration based on the end time of the software download schedule based on subsequent scheduler iterations closest to the end time of the channel.

When a data rate is increase, the software download manager may not take any action. However, when the data rate is decreased, the software download manager checks if the new data rate is enough for the particular software download schedule. If the data rate is sufficient, the software download manager may do nothing. If the data rate is not sufficient, then the software download manager may follow the same logic regarding the end date described above.

Figure 10:
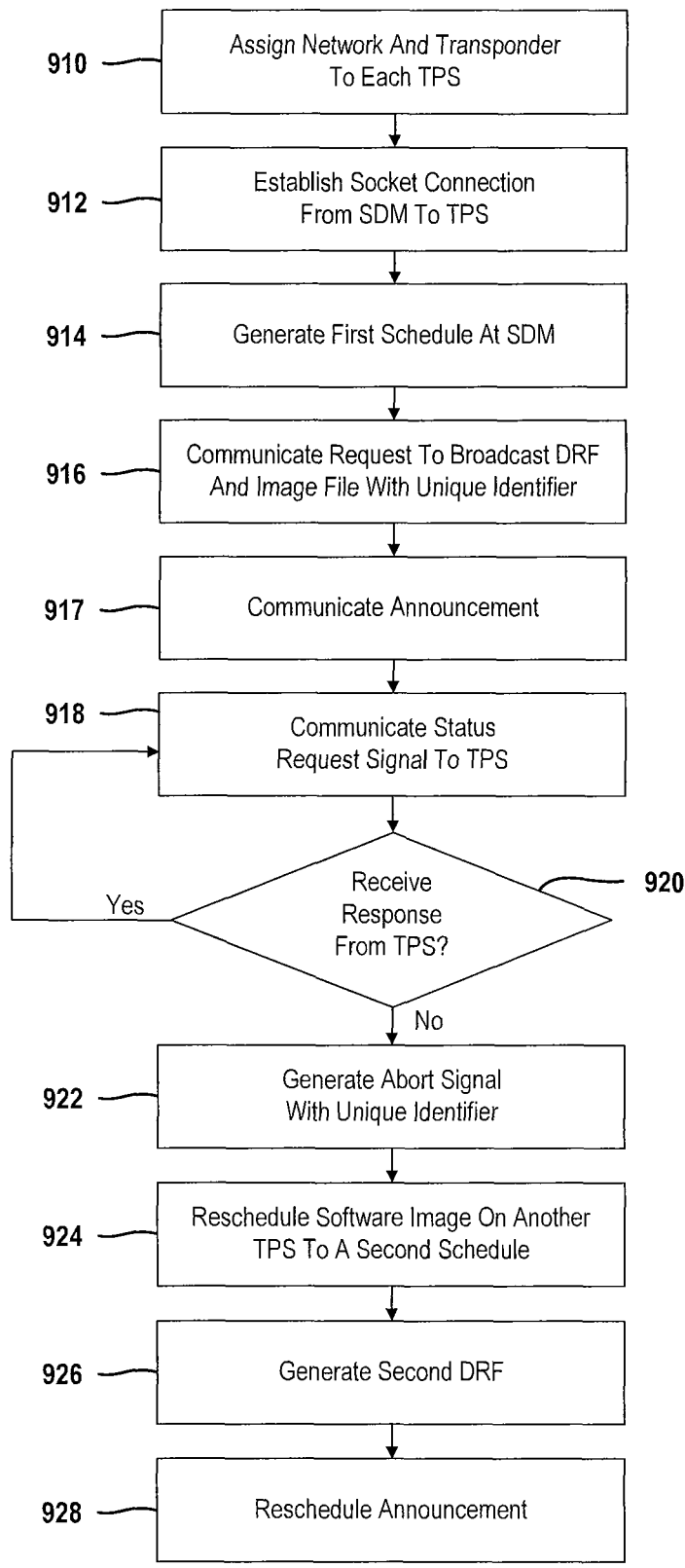
FIG. 10 is a flowchart of a method for monitoring the transport processing system.

Referring now to FIG. 10, a method for interfacing with the transport processing systems (TPS) is set forth. As mentioned above, the transport processing systems may be regular transport processing systems that include a primary and backup transport processing system or engineering transport processing system. Several transport processing systems may be associated with a system. In step 910, a network and transponder are assigned to each transport processing system. In step 912, a socket connection from the software download manager to the transport processing system is established. This may be performed through a queue. In step 914, a first software download manager schedule is generated as described above. In step 916, a request is communicated to broadcast the download resolution file (DRF) and the software image file with a unique identifier. An announcement may also be communicated according to the first schedule with directions for a user device to find the DRF in step 917.

In step 918, a status request signal is communicated to the transport processing system from the software download manager. In step 920, when a response signal is received from the transport processing system, another status request may be generated in step 918. These may be done periodically to ensure that the software image is being communicated properly. In step 920, if a response is not received from the transport processing system, a failure may be determined. An abort signal with the unique identifier is communicated to the TPS so the image file and associated DRF discontinues broadcast or attempts to broadcast. In step 924, the software image may be rescheduled on another transport processing system. Rescheduling may take place based upon the priority of the particular software image and the broadcast mode according to a second schedule. In step 926, a second download resolution file may be generated that corresponds to directions to the second transport processing system. In step 928, the announcement associated with the software images may also be rescheduled.

Figure 11:
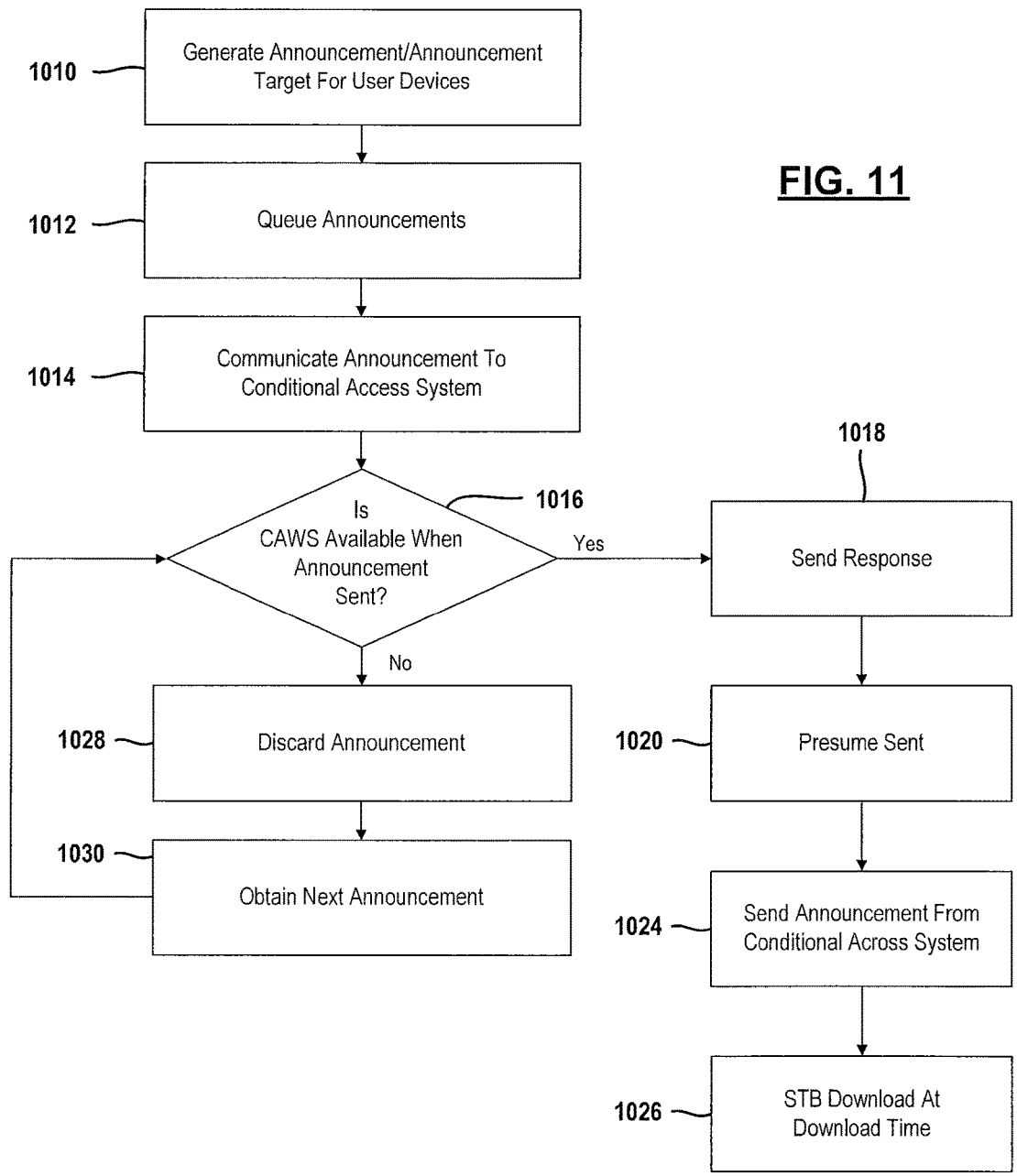
FIG. 11 is a flowchart of a method for monitoring the conditional access system.

Referring now to FIG. 11, the communication between the software download manager and the conditional access system (CAWS) is set forth. As mentioned above, the conditional access system receives an announcement request to notify the set top box of available downloads. In step 1010, an announcement and announcement target is generated for a user device or group of user devices. In step 1012, it is determined whether or not a success signal has been received at the software download manager. If a success signal has been received in step 1016, step 1018 presumes that the announcement was sent successfully. In step 1016, if the success signal is not received in step 1020, announcements are queued. The announcements may be queued into three queues as either generally addressed, targeted or by conditional access module identifier. The conditional access module identifier may be referred to as an access card. Each queue may have a configurable amount of time delay between each announcement. A configurable delay allows for the software download manager to throttle the demand on the conditional access system. In step 1016, if the conditional access system is available when the announcement is sent, a response signal is communicated to SDM in step 1018. In step 1020 the announcement is presumed to be sent by the conditional access system. The announcement is sent by the conditional access system in step 1024. In step 1026, the user device downloads the software image at the download time in response to the DRF file.

Referring back to step 1016, if the conditional access system is not available when the announcement is sent, the announcement may be discarded in step 1028. After step 1028 the next announcement is obtained from the queue in step 1030. After step 1030 the system proceeds with step 1016 again.

Figure 12:
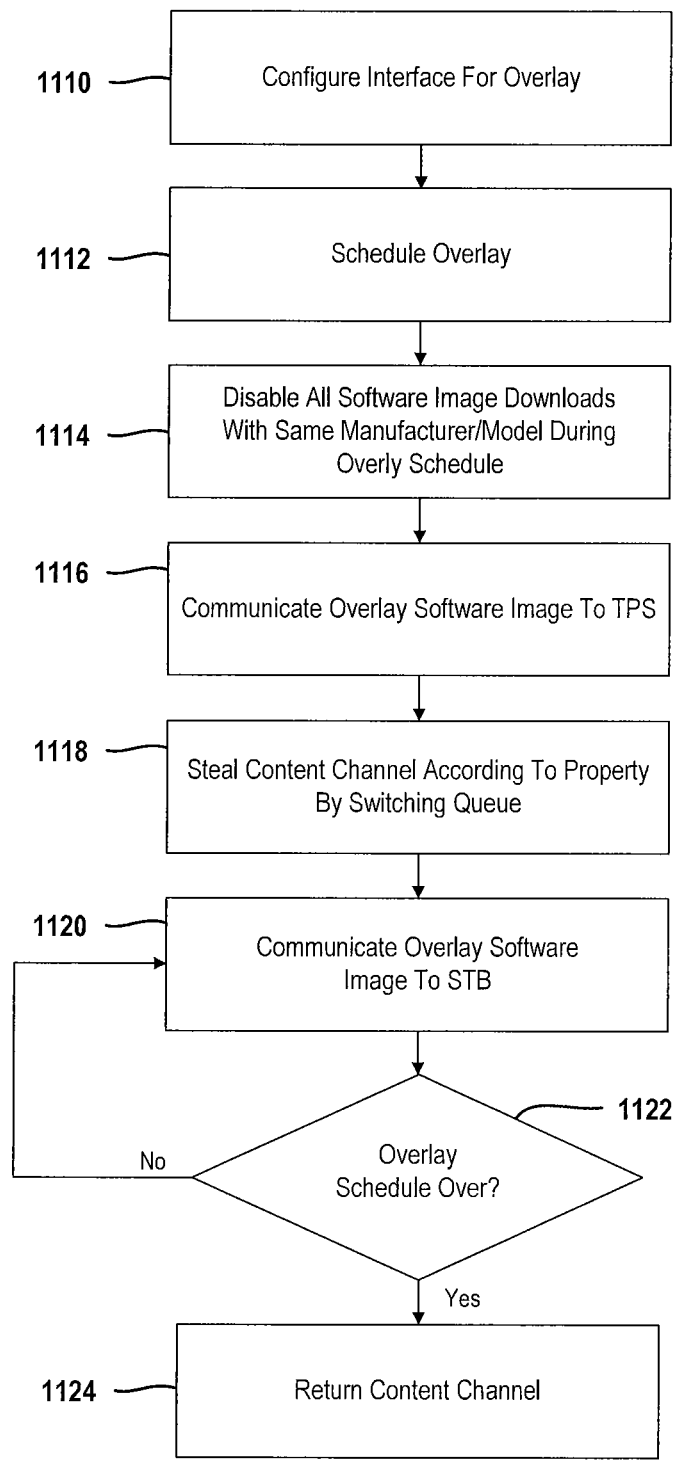
FIG. 12 is a flowchart of a method for providing overlay software download images.

Referring now to FIG. 12, in certain conditions, an overlay software image may be placed and communicated through the transport processing system. One example of a suitable condition for using an overlay is when a beta test for a particular number of cutting edge users is provided. For example, a beta test may take place by communicating a beta software image to various users during a particular or limited time. Certain users may be instructed to receive the beta software image. In step 1110, an interface for the overlay is configured. The interface may be a graphical user interface that instructs the user to enter certain conditions, including a name and the associated images. In step 1112, the overlay software image is scheduled preferably using the same graphical user interface. As mentioned above, the overlay software image may be scheduled for a certain time period for which beta-participating consumers may receive the software image. The overlay scheduled may borrow a content channel already in use. An overlay software download may have a required network transponder and thus the content channel borrowed may be from that network transponder.

In step 1114, the first software image that is currently being downloaded or communicated is disabled or discontinued. The first software image may be communicated from a first queue to the transport processing system prior to disabling. The software images with the same manufacturer, model number or other identifier as the overlay schedule are the images that may also be disabled. In step 1116, an overlay software image is communicated to the transport processing system. It should be noted that a second or overlay queue may be established for the transport processing system that first software image used. The first software image may be in a first queue and the second software image may be in an overlay queue. In step 1118, the content channel is switched from the first queue to the overlay queue. In step 1120, the overlay software image is communicated to the user device or set top box from the overlay queue to the TPS. The user device software image may then be replaced by the development software image. In step 1122, if the overlay schedule is not over, the overlay software image is continually broadcast in step 1120. When the overlay schedule is over or complete in step 1122, step 1124 returns the content channel to the first software image and the first software image may then be downloaded at the user device. This interruption may take place automatically and the first image restarted without further intervention by a system operator.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method comprising:
    generating a schedule for a software image at a software download manager in response to channel data, said channel data comprising a channel identifier for locating the software image;
    generating, in the software download manager, a download resolution file having software image data corresponding to the software image, the channel identifier, and a broadcast location of the software image;
    communicating a software image and the download resolution file to a transport processing system in response to the schedule;
    broadcasting the software image and the download resolution file;
    generating, in the software download manager, an announcement having user device identifiers and a download resolution file location therein;
    communicating the announcement to user devices corresponding to the user device identifiers after the software image and the download resolution file are being broadcasted;
    in response to the announcement, locating, at the user device, the download resolution file based on the download resolution file location;
    determining, at the user device, the broadcast location of the software image from the download resolution file; and
    receiving and storing the software image in the user device based on the broadcast location.

2. A method as recited in claim 1 wherein the download resolution file location comprises at least one of a network identifier, a service channel identifier, a data rate and a transponder identifier.

3. A method as recited in claim 1 further comprising receiving the software image at the software download manager, and storing the software image in a memory of a file system.

4. A method as recited in claim 3 wherein broadcasting the software image and the download resolution file comprises generating a broadcast request at the software download manager and communicating the request to the transport processing system, retrieving the software image and the download resolution file from the memory and broadcasting the software image and the download resolution file from the transport processing system.

5. A method as recited in claim 3 wherein broadcasting the software image and the download resolution file comprises generating a broadcast request at the software download manager and communicating the request to the transport processing system, retrieving the software image and the download resolution file from the memory and broadcasting the software image and the download resolution file from the transport processing system through a satellite.

6. A method as recited in claim 3 further comprising:
    assigning content channels to priority groups so that the priority groups have group characteristics based on content channel data from the content channels; and
    communicating software images through the content channels based on the software image data and the content channel data.

7. A method as recited in claim 6 further comprising communicating the software images from the groups to a transport processing system and broadcasting the software images to the user device from the transport processing system.

8. A method as recited in claim 6 wherein the group characteristics comprise continuous download or non-continuous download.

9. A method as recited in claim 1 further comprising communicating the software image to the software download manager.

10. A method as recited in claim 1 further comprising communicating content channel data to the software download manager from a broadcast management system.

11. A method as recited in claim 1 further comprising communicating content channel data to the software download manager.

12. A method as recited in claim 11 wherein communicating content channel data comprises communicating at least one of a network identifier, a service channel identifier, a data rate and a transponder identifier.

13. A method as recited in claim 1 further comprising scheduling a timing between the download resolution file and the announcement.

14. A method as recited in claim 1 wherein the announcement is communicated from a first system and the download resolution file is communicated from a second system different than the first system.

15. A method as recited in claim 14 wherein the first system comprises a conditional access system.

16. A method as recited in claim 14 wherein the second system comprises a transport processing system.

17. A method as recited in claim 1 further comprising assigning a multicast IP identifier and a port identifier to the software image in the software download manager.

18. A system comprising:
    a guide system generating content channel data signals comprising a channel identifier for locating a software image;
    a software download manager in communication with the guide system and generating an announcement having user device identifiers and a download resolution file location therein for software images, and a download resolution file having software image data corresponding to the software image, the channel identifier and a broadcast location of the software images, said download manager communicating the announcement and the download resolution file; and
    a user device having user device identifier data, receiving the download resolution file that is already broadcasting in response to receiving the announcement based on the user device identifier and the download resolution file location, determining the broadcast location of the software image from the download resolution file, receiving and storing a software image of the software images in the user device in response to the broadcast location from the download resolution file.

19. A system as recited in claim 18 further comprising a conditional access system wherein the software download manager communicates the announcement to the conditional access system.

20. A system as recited in claim 18 further comprising a transport processing system wherein the software download manager communicates the software image and the download resolution file to the transport processing system.

21. A system as recited in claim 18 wherein the download resolution file comprises software image location data.

22. A system as recited in claim 18 further comprising:
a broadcast management system generating a content channel data signal; and
said software download manager receiving the software images, said software download manager forming groups and assigning content channels to groups so that the groups have group characteristics based on content channel data from the content channels;
said software download manager communicating the software images to the groups based on the content channel data and software image data.

23. A system as recited in claim 22 further comprising a transport processing system and a user device, said software download manager communicating the software images from the groups to the transport processing system, said transport processing system broadcasting the software images to the user device.

24. A system as recited in claim 23 wherein the software download manager communicates the software images and a resolution file from the groups to the transport processing system and said transport processing system broadcasting the software images and the resolution file to the user device in response to a broadcast request.

* * * * *